United States Patent [19]
Takeuchi

[11] 3,806,985
[45] Apr. 30, 1974

[54] APPARATUS FOR AIR DRYING VEHICLES
[75] Inventor: Shigeo Takeuchi, Nagoya, Japan
[73] Assignee: Takeuchi Tekko Kabushiki Kaisha, Nagoya-shi, Japan
[22] Filed: Jan. 12, 1973
[21] Appl. No.: 322,972

[30] Foreign Application Priority Data
May 30, 1972 Japan.............................. 47-52926

[52] U.S. Cl..................... 15/307, 15/316 R, 15/405
[51] Int. Cl................................................ A47l 5/38
[58] Field of Search...... 15/301, 306 B, 307, 318 R, 15/316 R, 405

[56] References Cited
UNITED STATES PATENTS

| | | | |
|---|---|---|---|
| 2,440,157 | 4/1948 | Rousseau | 15/316 R X |
| 2,788,009 | 4/1957 | Lones | 15/312 R X |
| 2,132,303 | 10/1938 | Lathrop | 15/316 R X |
| 2,803,892 | 8/1957 | Hurst | 15/306 B X |
| 2,896,644 | 7/1959 | Emanuel | 15/312 R X |
| 2,948,907 | 8/1960 | Schmidt | 15/312 R X |
| 3,073,321 | 1/1963 | Lukas | 15/312 R X |
| 2,949,678 | 8/1960 | Anderson | 15/405 X |

Primary Examiner—Harvey C. Hornsby
Assistant Examiner—C. K. Moore
Attorney, Agent, or Firm—Eric H. Waters

[57] ABSTRACT

An apparatus for air drying vehicles capable of efficiently drying the opposite sides of a vehicle during movement thereof irrespective of the size and particularly of the width of the vehicle. It includes, among others, an air nozzle assembly particularly designed to form an air blast at all times appropriately close to the adjacent side of the vehicle being moved and comprising, among others, a main nozzle orifice and an auxiliary nozzle or spout member pivotally mounted on one side thereof and automatically swingable between a normal operative position covering the main nozzle orifice to serve as an extension nozzle and an inoperative position retracted to expose the main nozzle orifice.

4 Claims, 9 Drawing Figures

APPARATUS FOR AIR DRYING VEHICLES

BACKGROUND OF THE INVENTION

The present invention relates to apparatus for air drying vehicles such as automobiles after they have been washed and during movement thereof and more particularly to nozzle means employed in such apparatus for directing air under pressure against the vehicle being dried.

Known in the art is an air dryer for vehicles of the type which comprises a generally portal shaped frame through which vehicles may be moved and air nozzle means arranged on the inner sides of the portal frame and connected with air blower means, the arrangement being such that air under pressure is directed against a freshly washed vehicle for the purpose of removing liquid therefrom for drying purposes.

In previous forms of air dryer of this type, however, the air nozzles have been rigidly secured to the frame and unable to accommodate various sizes of vehicles and particularly varying widths thereof. That is to say, in cases where the nozzles are arranged in positions appropriate for the purpose of drying large vehicles having relatively large widths, no satisfactory drying effects can be obtained with vehicles of relatively small widths on account of the unduly large spacing between the vehicle being dried and the nozzles whereas, if the nozzles be arranged in positions appropriate for the purpose of drying small vehicles of limited width, a danger of the nozzles physically engaging and hurting the vehicle being dried would arise in cases where larger vehicles are dried.

SUMMARY OF THE INVENTION

In view of the above difficulties previously encountered in the art of air drying vehicles, the present invention has for its object the provision of an apparatus for air drying vehicles of the general type described which is capable of drying vehicles at all times efficiently irrespective of the size of the vehicle being dried.

To attain the object, the present invention proposes to provide an air nozzle assembly including a main air nozzle secured to the dryer frame and which may itself be of any conventional form and an auxiliary nozzle or spout member pivotally mounted on said main air nozzle and swingable between an operative position extending directly from the air eduction or orifice end of the main air nozzle to serve as an extension thereof for dry vehicles of smaller sizes and an inoperative position retracted to expose the orifice of the main air nozzle when a larger vehicle is dried.

Another object of the invention is to provide an air nozzle assembly of the type described in which the auxiliary nozzle member is automatically swung into its inoperative retracted position when a larger vehicle is moved to approach the air nozzle assembly and into the extended operative position when the vehicle has been moved past the air nozzle assembly.

A further object of the present invention is to provide over-center means for biasing the auxiliary nozzle member in either direction of swing movement thereof so that the member may be held stable in either of its operative and inoperative positions.

BRIEF DESCRIPTION OF THE DRAWINGS

The present invention will now be described in detail with reference to the accompanying drawings, which illustrate one preferred embodiment of the invention and in which.

DESCRIPTION OF THE PREFERRED EMBODIMENT

Figure 1:
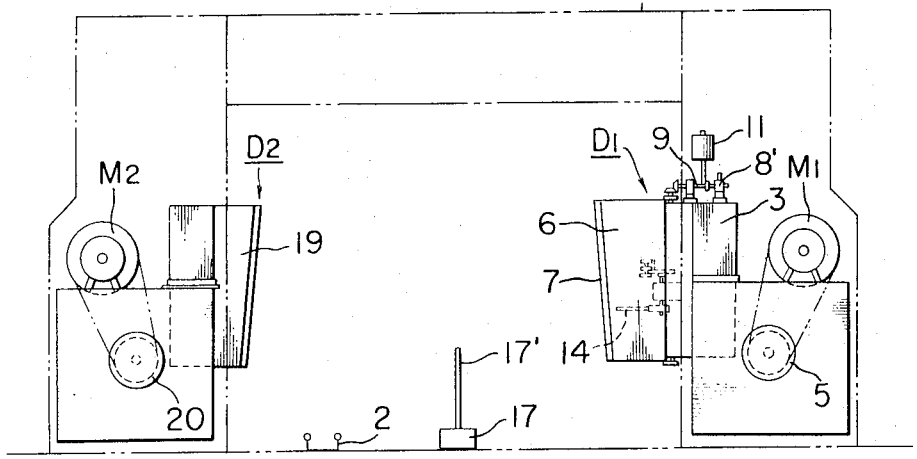
FIG. 1 is a partly schematic front elevational view of the embodiment.
Figure 2:
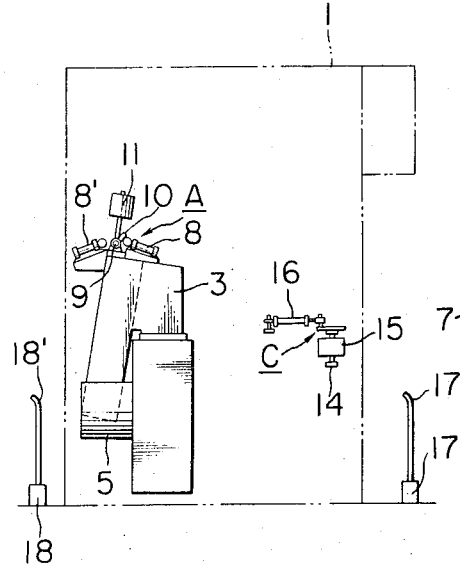
FIG. 2 is a partly schematic side elevational view of same.

Referring to the drawings, the apparatus shown includes a frame 1 of portal form through which vehicles may be moved under the guidance of a guide rail 2 which is laid on the floor under the frame in an off-center position and in which rail is arranged a conveyor, not shown, for carrying forward a vehicle through the portal frame.

On the opposite insides of the portal frame 1 there are provided a drying nozzle assembly $D_1$ constructed and arranged according to the present invention and a known type of drying nozzle assembly $D_2$ in opposing relation to each other. Description will next be made of the construction and arrangement of the nozzle assembly $D_1$, which includes a main nozzle casing 3 rigidly secured to the associated inner side of the frame 1. The main nozzle casing 3 is formed at its inner end with a main nozzle orifice or spout 4 of vertically elongate cross section which slightly projects inwardly from the adjacent surface of the frame 1. The main nozzle casing 3 is connected with the discharge end of an air blower 5 mounted in the frame 1 and operable under the drive of a motor $M_1$ to feed the nozzle casing 3 with pressure air and form an air blast through the main nozzle orifice 4.

Figure 3:
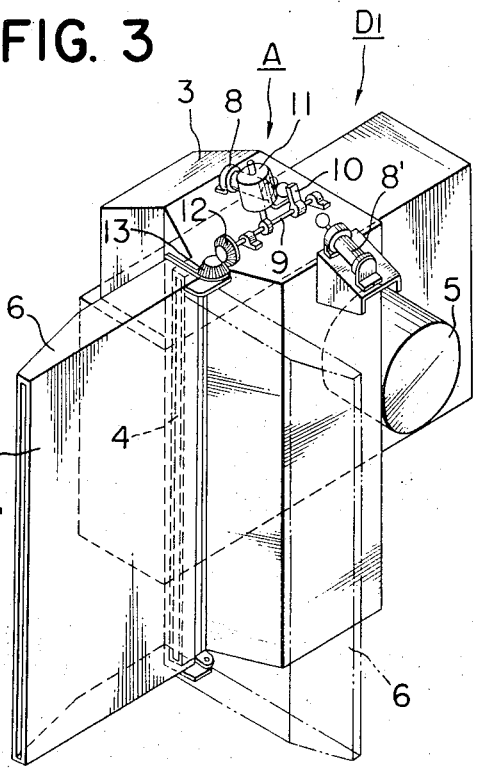
FIG. 3 is a perspective view, on an enlarged scale, of the air nozzle assembly shown in FIGS. 1 and 2.

Reference numeral 6 designates an auxiliary nozzle or spout member pivotally mounted on the main nozzle casing 3 on one side of the main nozzle orifice 4 and swingable about a vertical pivot axis between an extended operative position and a retracted inoperative position, as shown in FIG. 3 by the full and dotted lines. The auxiliary nozzle member 6, when extended or swung into its operative position substantially at right angles to the direction of movement of the vehicle being dried, covers the main nozzle orifice 4, as shown in FIG. 3 by the full lines, to serve as an extension thereof and pressure air ejected through the main nozzle orifice 4 is received by the auxiliary nozzle member 6 and further ejected through the air eduction or mouth end thereof inwardly of the portal frame. When the auxiliary nozzle 6 is retracted or swung into its inoperative position substantially parallel to the direction of vehicle movement, the main nozzle orifice 4 or the mouth end of the main nozzle casing 3 is exposed to allow pressure air to be ejected through the main nozzle orifice 4 directly into the space inside of the portal frame.

On the top surface of the nozzle casing 3 there is provided a drive mechanism A operable to swing the auxiliary nozzle member 6 between its operative and inoperative positions.

The drive mechanism A comprises a pair of pneumatic actuators 8 and 8' mounted on the top surface of the nozzle casing 3 in spaced opposite relation to each other and inclined upwardly, toward each other. Also, a rock shaft 9 is journaled on the top of the nozzle casing 3 intermediate the pneumatic actuators 8 and 8' and has a radially extending lug 10 formed integrally with the rock shaft. A rod weighted as indicated at 11 is secured to the rock shaft 9 and, extending radially therefrom, serves as over-center bias means effective under gravity to hold the rock shaft 9 in either of its opposite angular positions as defined by contacting engagement of the lug 10 with the plunger rods of the respective pneumatic actuators 8 and 8'.

Fixed to one end of the rock shaft 9 is a bevel gear 12 which is in mesh with another bevel gear 13 fixedly mounted on the top of the auxiliary nozzle member 6 in aligned relation with the pivotal connection thereof with the nozzle casing 3. The arrangment is such that, as the rock shaft 9 is rocked by either of the pneumatic actuators 8 and 8' through the medium of lug 10 in one direction or the other, the auxiliary nozzle member 6 is rotated through the medium of the mating bevel gears 12 and 13 from its extended position to its retracted position or in reverse.

A feeler element 14 is mounted on that inner side of the portal frame 1 on which the nozzle assembly D₁ is arranged and in a position ahead thereof. The feeler 14 is tiltable when engaged by the vehicle to be dried, as will be described hereinafter, and is associated with a control device C provided for operation of the pair of pneumatic actuators 8 and 8'. The control device C comprises a switch mechanism 15 operable by the feeler 14 and an air cylinder 16 operable under the control of the switch mechanism 15 and serves to selectively feed the pneumatic actuators 8 and 8' with pressure air from the cylinder 16 through valve means.

On the floor on the front and rear sides of the portal frame 1 are arranged foot switches 17 and 18 which include respective operating levers 17' and 18' taking the form of a vertically extending flexible feeler rod and are operable by the vehicle moving through the portal frame.

The known type of drying nozzle assembly D₂, arranged opposite to the nozzle assembly D₁, includes an air nozzle 19, an air blower 20 and a drive motor M₂.

Operation of the above-described apparatus for air drying vehicles will now be described with particular reference to FIG. 4.

Figure 4A:
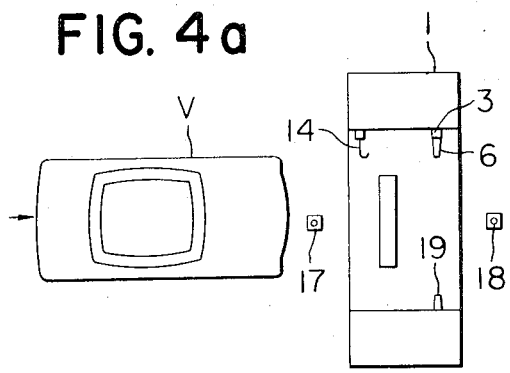
FIG. 4 represents schematic plan views $a$, $b$, $c$ and $d$ showing relative positions of the drying apparatus and a vehicle being dried in successive stages of the drying process.
Figure 4B:
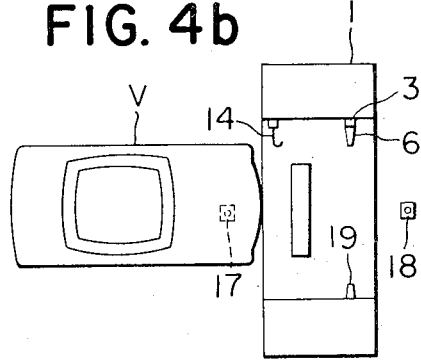
Figure 4C:
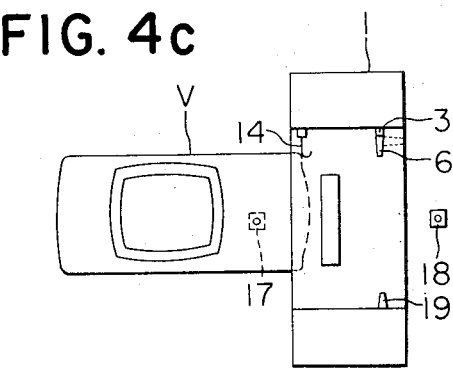
Figure 4D:
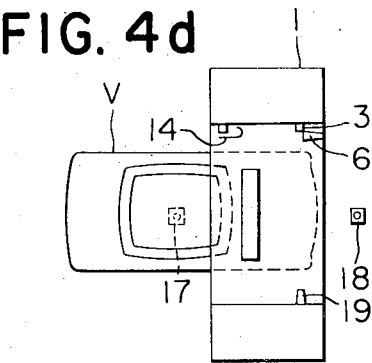
Figure 4E:
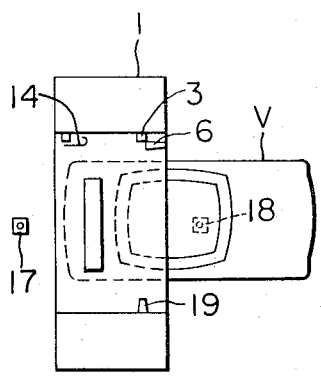
Figure 4F:
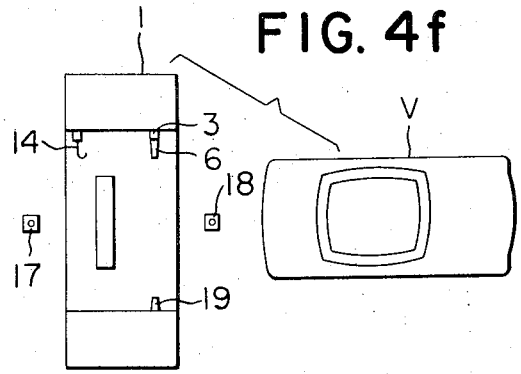

Assuming first that a vehicle V of relatively large size is guided onto the guide rail 2 for movement therealong when the auxiliary nozzle member 6 and feeler element 14 are in their respective extended positions (FIG. 4a), the vehicle V proceeding into and through the portal frame 1 first engages the feeler rod 17' at the front side of the frame to cause the foot switch 17 to operate (FIG. 4b) and then the front end portion of the vehicle V comes into contacting engagement with the feeler element 14 (FIG. 4c), causing the latter to retract or tilt down thereby to operate the control device C so that one of the pneumatic actuators 8 is energized and the plunger rod thereof is extended to turn the rock shaft 9 clockwise, as viewed in FIG. 3, through the medium of the lug 10 formed thereon whereby the auxiliary nozzle or spout member 6 is swung through the medium of mating bevels 12 and 13 into its retracted inoperative position, as shown in FIG. 4d. Under this situation, pressure air, being fed by air blower 5 into the nozzle casing 3, is directly ejected through the main nozzle orifice 4 to dry the adjacent side of the vehicle being moved.

The vehicle thus proceeding while its side surface is being dried releases the feeler rod 17' of foot switch 17 but the feeler element 14 is continuously held in its tilted position to keep the auxiliary nozzle member 6 retracted in its inoperative position since the feeler rod 18' arranged on the exit side of the frame 1 is engaged by the vehicle to operate the foot switch 18 prior to the releasing of feeler rod 17'.

As the vehicle further proceeds, the feeler rod 18' is also released and the control device C operates in reverse allowing the feeler element 14 to restore its normal extended position while at the same time energizing the other pneumatic actuator 8' so that the plunger rod thereof acts upon the lug 10 formed on the rock shaft 9 to turn the latter in the opposite direction or counterclockwise as viewed in FIG. 3 thereby to turn the auxiliary nozzle member 6 back into its extended operative position.

It is to be noted at this point that even if the control device C or associated parts including the air lines connecting the device to the pneumatic cylinders 8 and 8' be in trouble, the auxiliary nozzle member 6 can be easily forced into its retracted inoperative position, for example, by the front end portion of a large-sized vehicle being dried so that there is no danger that the vehicle be injured.

In cases where a smaller vehicle is dried which has such a limited width that there is no contacting engagement of the vehicle with the feeler 14, the auxiliary nozzle member 6 remains in its extended operative position as the feeler 14 is not forced to tilt and the control device C remains in its neutral inoperative position. Accordingly, in such cases, pressure air forced into the nozzle casing 3 by air blower 5 is directed through the main nozzle orifice 4 into the auxiliary nozzle member 6 and ejected through the eduction or mouth end 7 thereof to impinge against the adjacent side surface of the vehicle being moved.

To summarize, the apparatus of the present invention includes a nozzle assembly of particular design comprising a main nozzle orifice and an auxiliary nozzle member 6 associated therewith and automatically operable into retracted position, whenever a larger vehicle enters the apparatus, to enable pressure air to be ejected through the main nozzle orifice 4 directly against the adjacent side of the vehicle, said auxiliary nozzle member 6 remaining in its extended operative position, when a smaller vehicle is dried, to receive the pressure air ejected through the main nozzle orifice 4 and form an air blast close to the adjacent side surface of the vehicle. It will thus be readily appreciated that according to the apparatus of the present invention air blasts can be formed at locations close to the side surfaces of a vehicle being dried irrespective of the size thereof to serve to dry the vehicle sides in a quick and effective manner.

While one preferred embodiment of the present invention has been shown and described, it will be apparent to those skilled in the art that various changes and modifications may be made therein without departing from the spirit and scope of the invention as defined in the appended claims.

What is claimed is:

1. An apparatus for air drying freshly washed vehicles during movement thereof comprising a portal frame through which vehicles may be moved, an air nozzle assembly secured to one inner side of said portal frame, and an air blower for feeding said air nozzle assembly with air under pressure, said air nozzle assembly including a nozzle casing connected with said air blower, a nozzle orifice formed on said casing, an auxiliary nozzle member pivotally secured to said casing on one side of said nozzle orifice on a vertical pivot axis and swingable between an operative position extending directly from said nozzle orifice substantially at right angles to the direction of movement of the vehicle being dried and an inoperative position retracted to expose said nozzle orifice, drive means operable to swing said auxiliary nozzle member between said operative and inoperative positions in either direction, and control means including a feeler element mounted on said inner side of said portal frame and operable when said feeler element is engaged by a part of the vehicle being moved to cause said drive means to operate in a direction to swing said auxiliary nozzle member into said inoperative position.

2. An apparatus as set forth in claim 1, in which said drive means are associated with said auxiliary nozzle member in such a manner that the latter can be swung in either direction independently of said drive means.

3. An apparatus as set forth in claim 1, further comprising over-center bias means associated with said drive means to hold stable said auxiliary nozzle member in either of its operative and inoperative positions.

4. An apparatus as set forth in claim 1, in which said drive means include a pair of pneumatic actuators arranged on said main nozzle casing in spaced opposite relation to each other, a rock shaft rotatably mounted on said main nozzle casing intermediate said pneumatic actuators and having a radially extending lug, a weighted rod radially secured to said rock shaft to bias the latter in either direction under gravity, and a pair of mating bevel gears including one fixedly mounted on said rock shaft and the other fixedly mounted on said auxiliary nozzle member in aligned relation with the pivotal connection thereof with said main nozzle casings, said pneumatic actuators being operable through the medium of said lug selectively to turn said rock shaft and said weighted rod over-center in respective opposite directions.

* * * * *